(12) United States Patent
Kim

(10) Patent No.: US 12,107,480 B2
(45) Date of Patent: Oct. 1, 2024

(54) MOTOR

(71) Applicant: LG INNOTEK CO., LTD., Seoul (KR)

(72) Inventor: Se Jong Kim, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 246 days.

(21) Appl. No.: 17/772,964

(22) PCT Filed: Oct. 29, 2020

(86) PCT No.: PCT/KR2020/014911
§ 371 (c)(1),
(2) Date: Apr. 28, 2022

(87) PCT Pub. No.: WO2021/107419
PCT Pub. Date: Jun. 3, 2021

(65) Prior Publication Data
US 2022/0399776 A1  Dec. 15, 2022

(30) Foreign Application Priority Data

Nov. 25, 2019 (KR) ........................ 10-2019-0152083

(51) Int. Cl.
*H02K 11/00* (2016.01)
*H02K 5/22* (2006.01)
*H02K 11/40* (2016.01)

(52) U.S. Cl.
CPC ............. *H02K 5/225* (2013.01); *H02K 11/40* (2016.01); *H02K 2211/03* (2013.01)

(58) Field of Classification Search
CPC .... H02K 5/225; H02K 11/40; H02K 2211/03; H02K 2213/03; H02K 11/33
See application file for complete search history.

(56) References Cited

U.S. PATENT DOCUMENTS

| 2019/0036426 A1 | 1/2019 | Umeda et al. | |
| 2019/0126972 A1* | 5/2019 | Okamura | ............. H05K 5/0047 |
| 2019/0326800 A1 | 10/2019 | Pyeon | |

FOREIGN PATENT DOCUMENTS

| KR | 10-2017-0082911 A | 7/2017 |
| KR | 10-2017-0088061 A | 8/2017 |
| KR | 10-2019-0057503 A | 5/2019 |
| KR | 10-2019-0118396 A | 10/2019 |

* cited by examiner

*Primary Examiner* — Thomas Truong
(74) *Attorney, Agent, or Firm* — Birch, Stewart, Kolasch & Birch, LLP

(57) ABSTRACT

The present invention provides a motor comprising: a shaft; a rotor coupled to the shaft; a stator disposed outside the rotor; a housing disposed outside the stator; a circuit board disposed on the stator; and a coupling member for coupling the circuit board to the housing. The circuit board includes a first region where a ground pattern is formed, and a second region which is the remainder excluding the first region, wherein the first region has a first hole, and the second region has at least one second hole. The coupling member includes a first screw which is coupled to the housing through one selected from among the first hole and the second hole.

17 Claims, 7 Drawing Sheets

[FIG. 1]
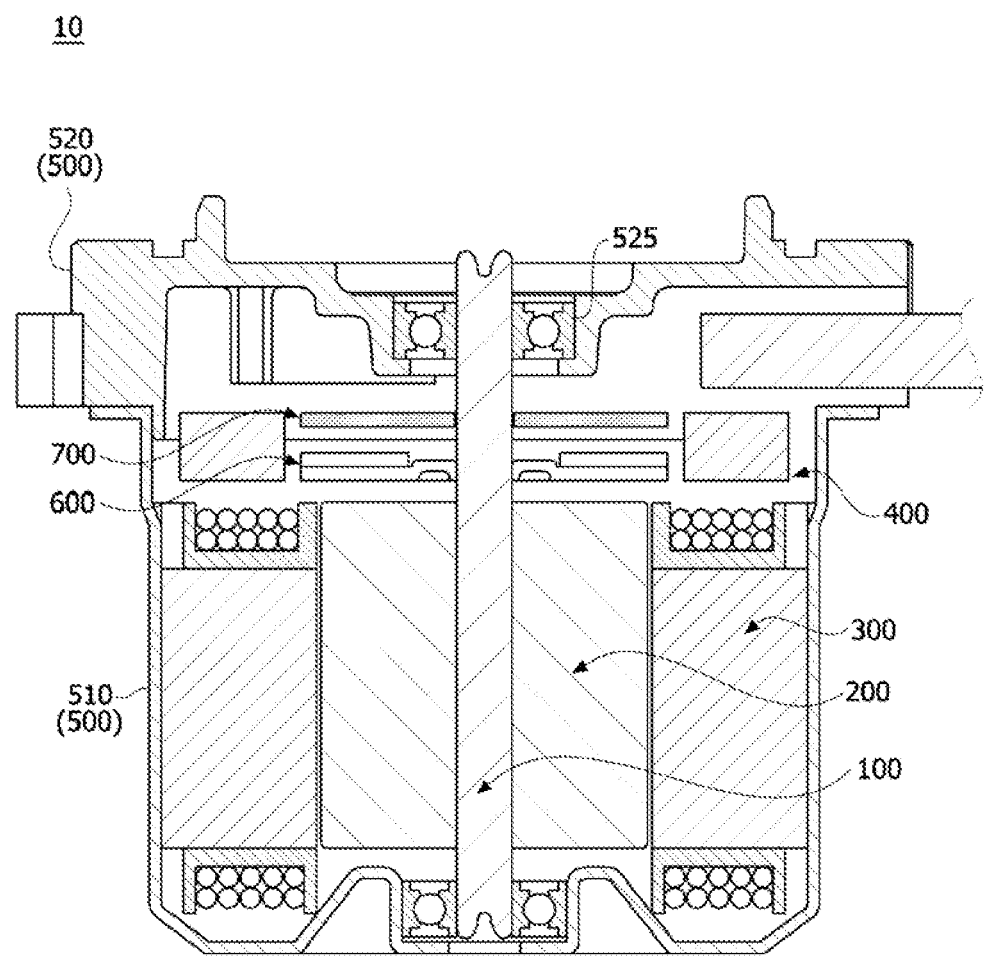

[FIG. 2]
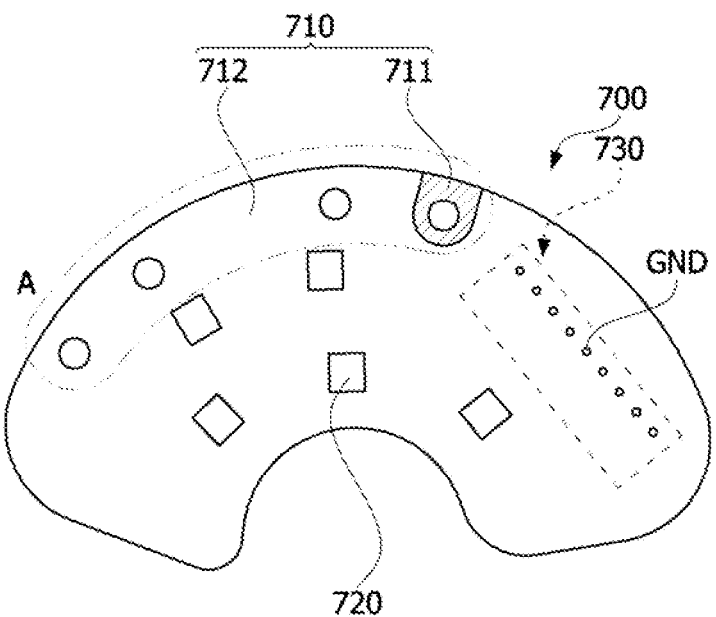
[FIG. 3]
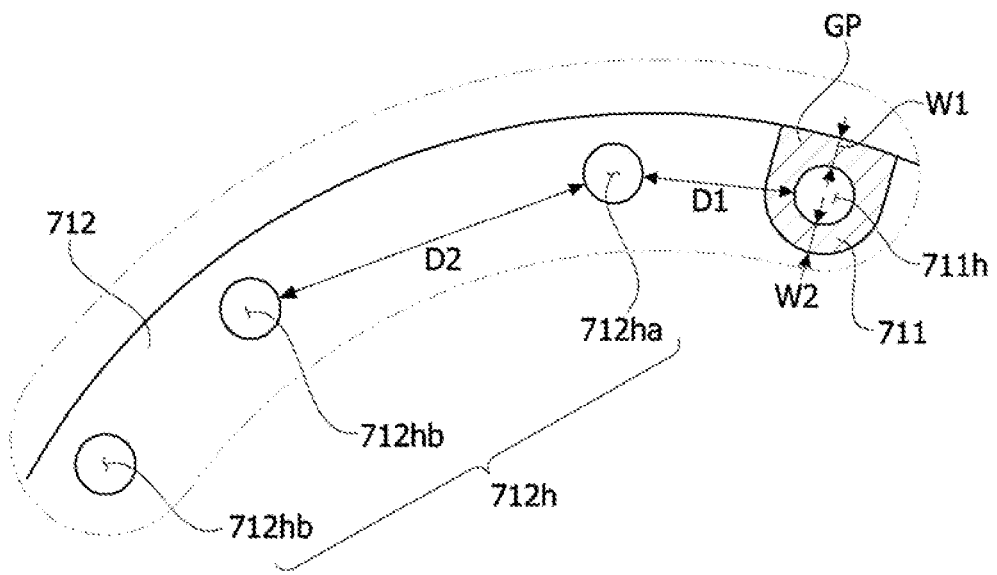

[FIG. 4]
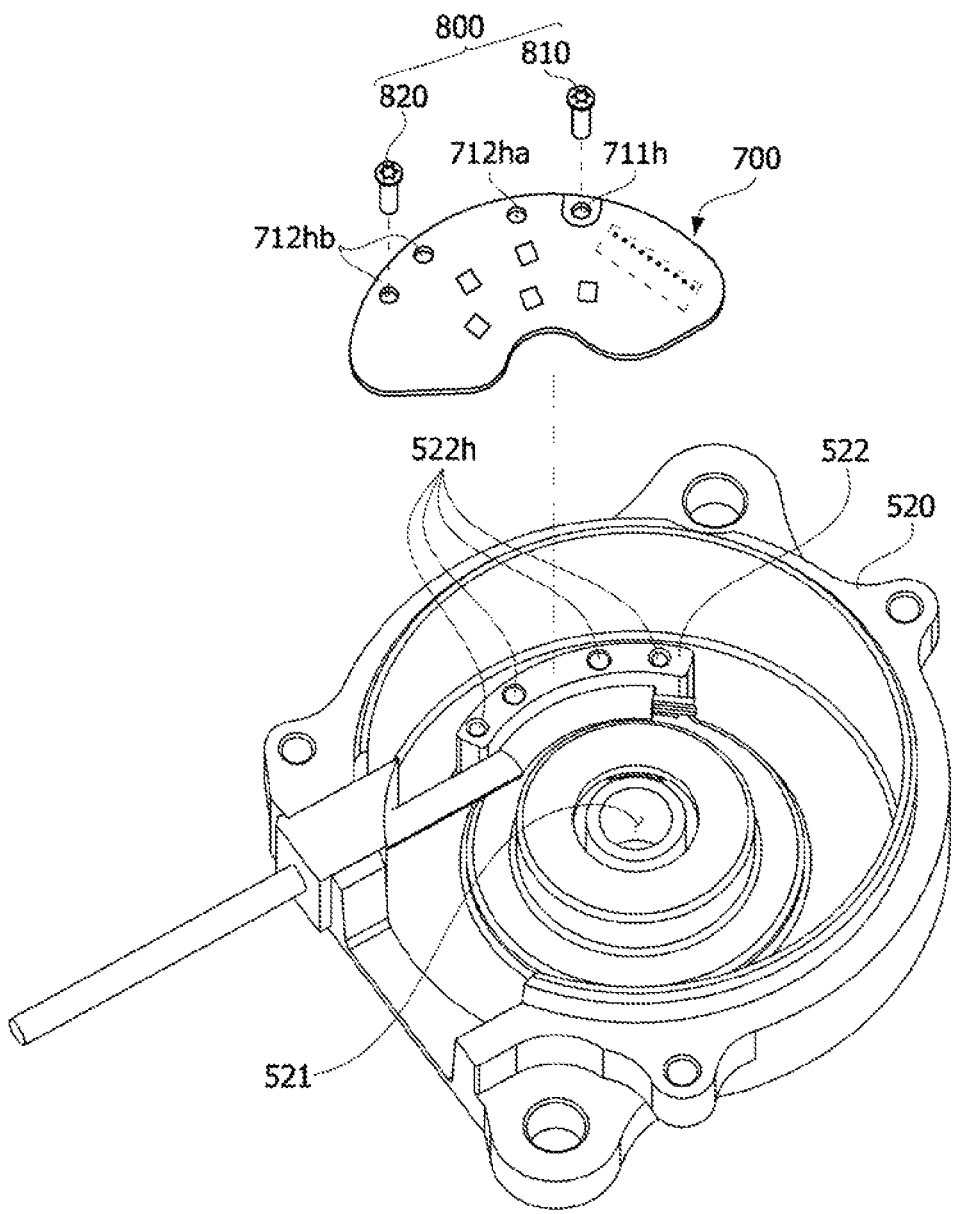

[FIG. 5]
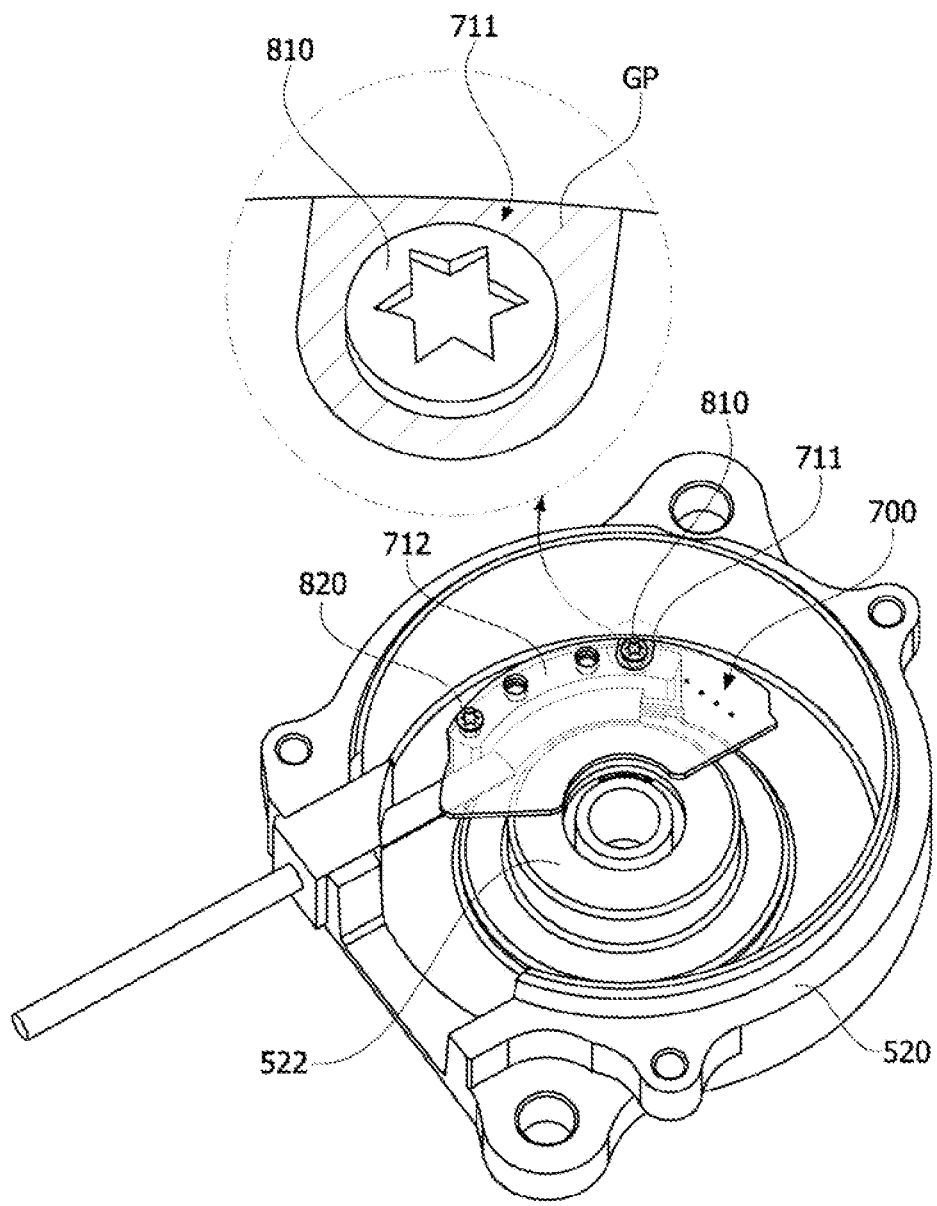

[FIG. 6]
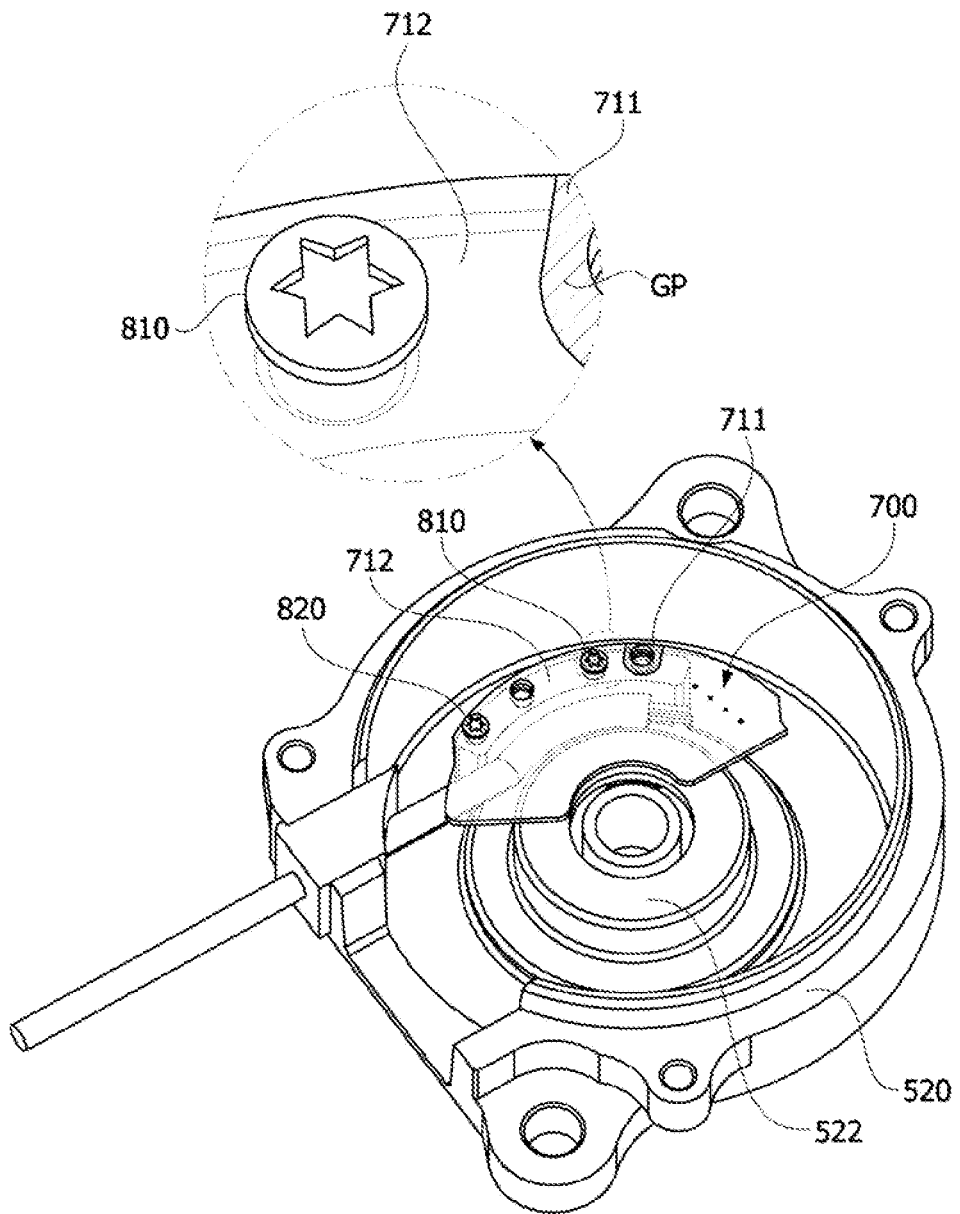

[FIG. 7]
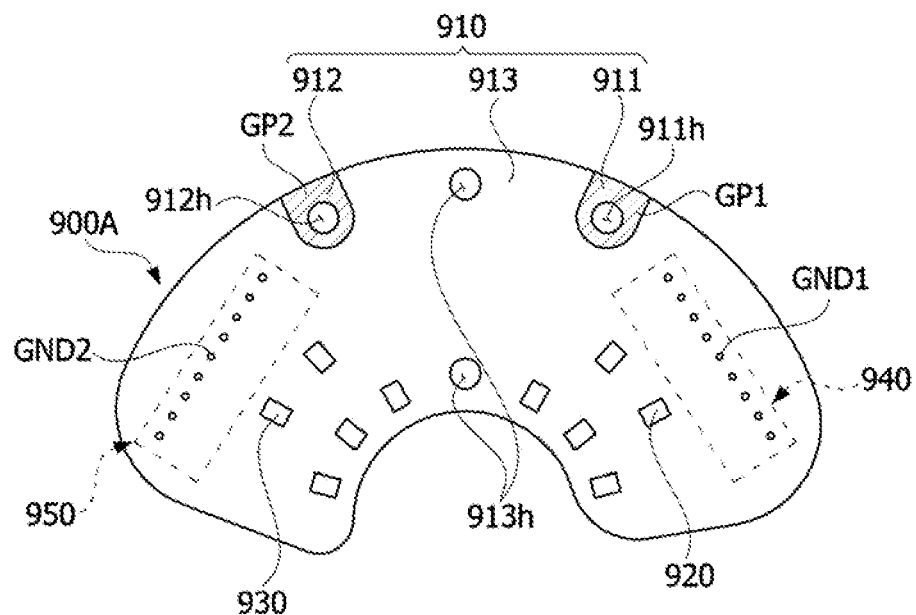
[FIG. 8]
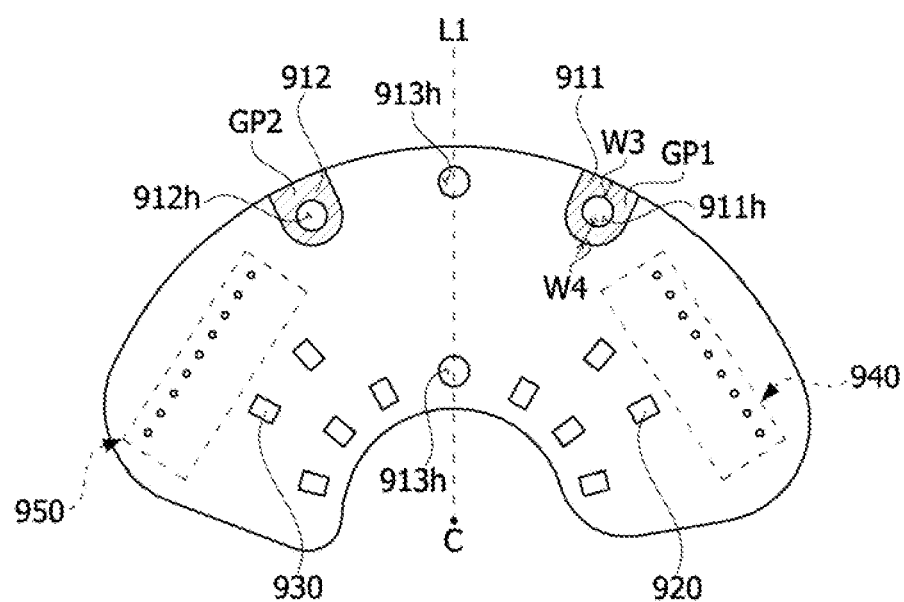

[FIG. 9]
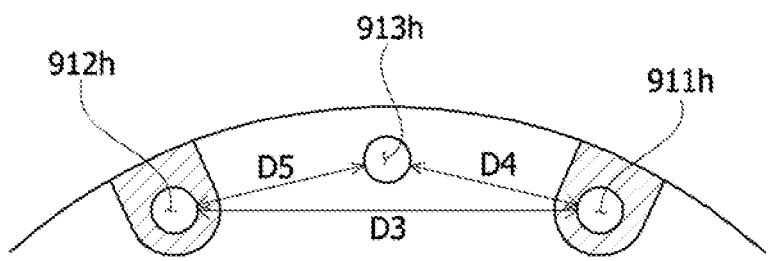
[FIG. 10]
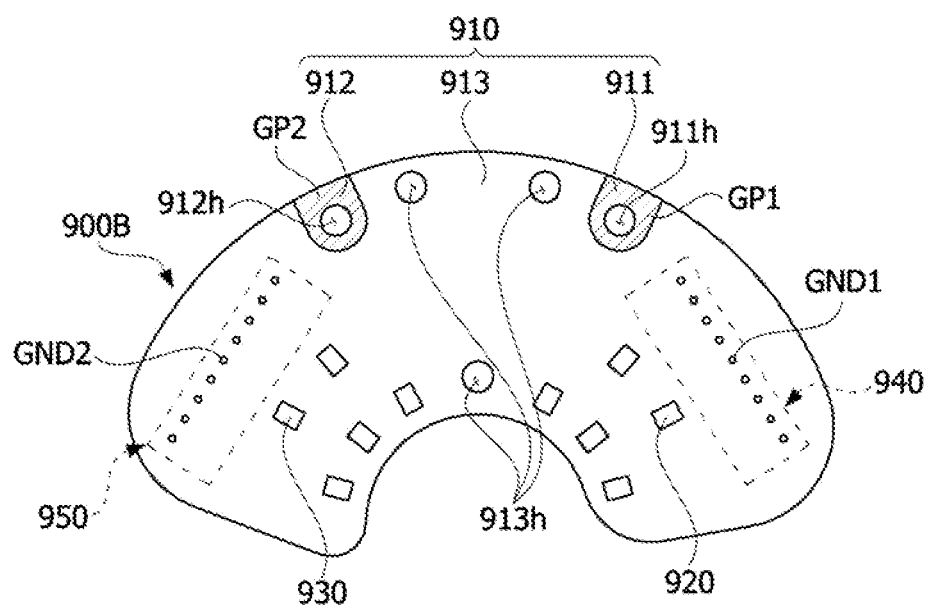

MOTOR

CROSS REFERENCE TO RELATED APPLICATIONS

This application is the National Phase of PCT International/Application No. PCT/KR2020/014911, filed on Oct. 29, 2020, which claims priority under 35 U.S.C. 119 (a) to Patent Application No. 10-2019-0152083, filed in the Republic of Korea on Nov. 25, 2019, all of which are hereby expressly incorporated by reference into the present application.

TECHNICAL FIELD

The present invention relates to a motor.

BACKGROUND ART

An electric power steering (EPS) system is an apparatus which secures turning stability of a vehicle and rapidly provides a restoring force so that a driver can safely drive the vehicle. An EPS system controls a vehicle's steering shaft to be driven by driving a motor using an electronic control unit (ECU) according to driving conditions detected by a vehicle speed sensor, a torque angle sensor, a torque sensor, and the like.

A motor includes a rotor and a stator. The motor includes a sensing magnet and a sensor as devices for detecting a position of the rotor. The sensing magnet is coupled to a shaft. The sensor is mounted on a circuit board. The circuit board is coupled to a lower surface of a bracket of the motor. Meanwhile, a cable may be inserted into the motor, and a wire of the cable may be connected to a connector of the circuit board.

Since such a circuit board has a structure susceptible to electromagnetic interference (EMI), there is a problem of increasing a risk of EMI failure during an EMI test, and thus, in order to solve the problem, a ground pattern corresponding to a Hall integrated circuit (IC) is formed on a board to reduce the risk of failure. However, both of a circuit board having a ground pattern and a circuit board without having a ground pattern may be used, or any one thereof may be used according to customer needs. In this case, a different process design is required according to whether there is a ground pattern on a board, and thus a problem of increasing a design cost is generated.

DISCLOSURE

Technical Problem

The present invention is directed to providing a motor allowing whether a bracket and a ground pattern of a board are grounded to be selected.

Technical Solution

One aspect of the present invention provides a motor including a shaft, a rotor coupled to the shaft, a stator disposed outside the rotor, a housing disposed outside the stator, a circuit board disposed on the stator, and a coupling member which couples the circuit board to the housing, wherein the circuit board includes a first region in which a ground pattern is formed and a second region excluding the first region, a first hole is formed in the first region, one or more second holes are formed in the second region, and the coupling member passes through one selected from the first hole and the second holes and is coupled to the housing.

A ground pattern may be formed around the first hole in the first region.

The coupling members may include one or more second screws which pass through one or more of the remaining second holes and are coupled to the housing.

The second holes may include a 2a hole disposed closest to the first hole and one or more 2b holes spaced apart from the 2a hole, the first screw may be disposed in one selected from the first hole or the 2a hole, and the second screw may be disposed in the 2b hole.

A shortest distance from the first hole to a border of the first region may be shorter than a distance between the first hole and the 2a hole.

Another aspect of the present invention provides a motor including a shaft, a rotor coupled to the shaft, a stator disposed outside the rotor, a housing disposed outside the stator, a circuit board disposed on the stator and including a board and a magnetic element mounted on the board, and a coupling member which couples the circuit board to the housing, wherein the circuit board includes a first region in which a first ground pattern is formed, a second region which is spaced apart from the first region and in which a second ground pattern is formed, and a third region excluding the first region, and the coupling member couples each of the first region and the second region to the housing or couples the third region to the housing.

A first hole may be formed in the first region, a second hole may be formed in the second region, one or more third holes may be formed in the third region, and the coupling members may include one or more first screws which pass through each of the first hole and the second hole or the third holes and are coupled to the housing.

A ground pattern may be formed around the first hole in the first region.

The coupling members may include one or more second screws passing through one or more of the third holes and coupled to the housing.

When a virtual line (L1) connecting a center of the shaft and the third hole is formed, with respect to the virtual line (L1), the first region may be disposed at one side, and the second region may be disposed at the other side.

Advantageous Effects

According to an embodiment, in a motor according to the present invention, a conventional board having a ground pattern and a board without having a ground pattern can be implemented as one board by changing positions of the screws coupled to the board to change whether a bracket and the circuit board are grounded.

DESCRIPTION OF DRAWINGS

FIG. 1 is a view illustrating a motor according to one embodiment of the present invention.
FIG. 2 is a plan view illustrating a circuit board.
FIG. 3 is an enlarged view illustrating region A in FIG. 2.
FIG. 4 is an exploded perspective view illustrating the circuit board, a bracket, and coupling members.
FIG. 5 is a perspective view illustrating a state in which the circuit board coupled to the bracket is grounded.
FIG. 6 is a perspective view illustrating a state in which the circuit board coupled to the bracket is not grounded.
FIGS. 7 to 9 are plan views illustrating a second example of the circuit board.

FIG. 10 is a plan view illustrating a third example of the circuit board.

MODES OF THE INVENTION

Hereinafter, exemplary embodiments of the present invention will be described in detail with reference to the accompanying drawings.

A direction parallel to a longitudinal direction (vertical direction) of a shaft will be referred to as an axial direction, a direction perpendicular to the axial direction about the shaft will be referred to as a radial direction, and a direction along a circumference of a circle having a radius in the radial direction about the shaft will be referred to as a circumferential direction.

FIG. 1 is a view illustrating a motor according to one embodiment of the present invention, FIG. 2 is a plan view illustrating a circuit board, FIG. 3 is an enlarged view illustrating region A in FIG. 2, and FIG. 4 is an exploded perspective view illustrating the circuit board, a bracket, and coupling members.

Referring to FIG. 1, the motor according to the embodiment may include a shaft 100, a rotor 200, and a stator 300.

The shaft 100 may be coupled to the rotor 200. When an electromagnetic interaction occurs between the rotor 200 and the stator 300 due to the supply of a current, the rotor 200 rotates, and the shaft 100 rotates in conjunction with the rotor 200. The shaft 100 may be connected to a vehicle's steering shaft and may transmit power to the vehicle's steering shaft.

The rotor 200 rotates through electrical interaction with the stator 300.

The rotor 200 may include a rotor core and magnets. The rotor core may be formed in a form in which a plurality of thin circular steel plates are stacked or a single container form. A hole to be coupled to the shaft 100 may be disposed in a central portion of the rotor core. The magnets may be attached to an outer circumferential surface of the rotor core. The plurality of magnets may be disposed along a circumference of the rotor core at predetermined intervals. Alternatively, the plurality of magnets may be formed to be buried in the rotor core. A housing 500 may accommodate the rotor 200 and the stator 300 therein.

A busbar 400 may be disposed on the stator 300. The busbar 400 may include terminals in an annular body. In addition, the terminals of the busbar 400 may include phase terminals electrically connected to U-phase, V-phase, and W-phase power sources and neutral terminals connecting the phase terminals. The phase terminals of the busbar may be electrically insulated from each other in order to divide currents into a U-phase current, a V-phase current, and a W-phase current and apply the U-phase current, the V-phase current, and the W-phase current to coils of the stator.

The housing 500 may include the rotor 200 and the stator 300 therein. The housing 500 may include a body 510 and a bracket 520.

The body 510 has a cylindrical shape. In addition, an upper portion of the body 510 is open. The bracket 520 covers the open upper portion of the body 510. The stator 300 may be positioned inside the body 510, and the rotor 200 may be disposed inside the stator 300.

A sensing magnet 600 is a device coupled to the shaft 100 to operate in conjunction with the rotor 200 in order to detect a position of the rotor 200.

A sensor configured to detect a magnetic force of the sensing magnet 600 may be disposed on a circuit board 700. In this case, the sensor may be a Hall integrated circuit (IC). The sensor detects changes in an N-pole and an S-pole of the sensing magnet 600 and generates a sensing signal.

The circuit board 700 may be fixed to the bracket 520 by coupling members 800.

The coupling members 800 may include a first screw 810 and a second screw 820. The first screw 810 may include a conductive material. More preferably, a ground pattern may be formed on the first screw 810. The first screw 810 serves to allow the circuit board 700 to be grounded through the bracket 520 while fixing one side of the circuit board 700 to the bracket 520. Meanwhile, the second screw 820 is spaced apart from the first screw 810 and fixes the other side of the circuit board 700 to the bracket 520. In this case, the second screw 820 may be formed of the same material as the first screw 810, but the second screw 820 may also not be conductive.

Referring to FIGS. 2 and 3, the circuit board 700 may include a board 710 and magnetic elements 720 mounted on the board 710. In this case, the magnetic elements 720 may include a plurality of Hall IC elements. In addition, the magnetic elements 720 may include a plurality of encoder signal magnetic elements. The magnetic elements 720 may detect a magnetic force of the sensing magnet 600 which operates in conjunction with the rotor 200 to detect the position of the rotor 200.

The board 710 may include a power terminal 730 electrically connected to the magnetic elements 720 at one side thereof. In this case, the power terminal 730 may include grounds GND of the magnetic elements 720. In addition, the grounds GND of the magnetic elements 720 may be formed separately from a power terminal Vcc of the magnetic elements 720. In addition, the board 710 may include a first region 711 and a second region 712. In the first region 711, a ground pattern GP may be formed.

The first region 711 may be electrically connected to the grounds GND of the magnetic elements 720. In addition, the first region 711 may be disposed at an outer edge of the board 710. In this case, the first region 711 may extend to an outer border of the board 710. However, although not illustrated in the drawings, the first region 711 may be spaced apart from the outer border of the board 710.

A first hole 711h may be formed in the first region 711. One first hole 711h may be formed. However, the present invention is not limited thereto. A plurality of first holes 711h may also be formed. In this case, the ground pattern GP may be formed around the first hole 711h in the first region 711. In addition, the first screw 810 to be coupled to the bracket 520 may pass through the first hole 711h. The first screw 810 passing through the first hole 711h may be in contact with the ground pattern GP.

The first region 711 may have a circular or partially circular shape. In addition, a radius of the first region 711 may be greater than a radius of the first hole 711h. Referring to FIG. 3, a shortest distance W1 from the first hole 711h to an edge of the first region 711 may be greater than a radius of an end portion of the first screw 810. In addition, a longest distance W2 from the first hole 711h to a border of the first region 711 may be smaller than a distance D1 between the first hole 711h and a second hole 712h which is closest to the first hole 711h.

In the second region 712, the magnetic elements 720 and the grounds GND of the magnetic elements 720 may be disposed. In addition, in the second region 712, at least one second hole 712h may be formed. The second hole 712h may be provided as a plurality of second holes 712h.

The second hole 712h may include a 2a hole 712ha and a 2b hole 712hb. The 2a hole 712ha and the 2b hole 712hb may be spaced apart from each other along an edge of the board 710.

The 2a hole 712ha may be disposed closest to the first hole 711h. In this case, the distance D1 between the 2a hole 712ha and the first hole 711h may be smaller than a distance D2 between the 2a hole 712ha and the 2b hole 712hb. The first screw 810 coupled to the bracket 520 may pass through the 2a hole 712ha, and in this case, one first screw 810 is provided, and the first screw 810 may pass through only one selected from the first hole 711h and the 2a hole 712ha. In this case, when the first screw 810 does not pass through the 2a hole 712ha, a guide member (not shown) may be disposed in the 2a hole 712ha.

The second screw 820 to be coupled to the bracket 520 may pass through the 2b hole 712hb. In this case, the 2b hole 712hb may be provided as a plurality of 2b holes 712hb, and the second screw 820 may pass through only one 2b hole 712hb. In this case, the second screw 820 may also pass through each of the second holes 712hb. In this case, a guide member (not shown) is disposed in the second hole 712hb through which the second screw 820 does not pass.

FIG. 4 is an exploded perspective view illustrating the circuit board and the bracket, FIG. 5 is a perspective view illustrating a state in which the circuit board coupled to the bracket is grounded, and FIG. 6 is a perspective view illustrating a state in which the circuit board coupled to the bracket is not grounded.

Referring to FIG. 4, the circuit board 700 is coupled to one surface of the bracket 520. A hole 521 is formed in a central portion of the bracket 520. The shaft 100 passes through the hole 521. In addition, the bracket 520 includes a coupling block 522. The coupling block 522 is disposed to protrude from a lower surface of the bracket 520. The coupling block 522 may be disposed in a circumferential direction about a center of the bracket 520. The coupling block 522 fixes the circuit board 700. A plurality of coupling holes 522h are formed in the coupling block 522.

Referring to FIG. 5, the circuit board 700 and the bracket 520 may be grounded through the first screw 810. In this case, the circuit board 700 is seated on one surface of the coupling block 522. In addition, the first screw 810 passes through the first hole 711h of the circuit board 700 and is coupled to the coupling hole 522h. In this case, the first screw 810 is in contact with the ground pattern GP of the first region 711. The first screw 810 serves to connect the circuit board 700 and the coupling block 522 in a ground state while fixing the circuit board 700 to the coupling block 522. Meanwhile, the second screw 820 may pass through the first hole 711h disposed farthest from the second hole 712h of the circuit board 700 and be coupled to the coupling hole 522h. In addition, a guide member (not shown) extending from the coupling block 522 may be disposed in each of the remaining second holes 712h.

Referring to FIG. 6, the circuit board 700 may be fixed to the bracket 520 and may not be grounded through the bracket 520. In this case, the circuit board 700 is seated on the coupling block 522 as in FIG. 5. However, the first screw 810 passes through the second hole 712h of the circuit board 700 and is coupled to the coupling hole 522h. In this case, the first screw 810 may pass through the 2a hole 712ha. In addition, the second screw 820 may pass through the second hole 712h disposed farthest from the first hole 711h of the circuit board 700 and be coupled to the coupling hole 522h. Similarly, a guide member (not shown) extending from the coupling block 522 may be disposed in the remaining second hole 712h.

According to the motor according to the present invention described above, a conventional board having a ground pattern and a board without having a ground pattern can be implemented as one board by changing positions of the screws coupled to the board to change whether the bracket and the circuit board are grounded. Accordingly, a design cost of the circuit board is reduced, and a circuit board suitable for an EMI test or customer requirements can be provided.

FIGS. 7 to 9 are plan views illustrating a second example of the circuit board.

Referring to FIG. 7, a circuit board 900 may include a board 910, first magnetic elements 920, and second magnetic elements 930. In addition, the circuit board 900 may include a first power terminal 940 electrically connected to the first magnetic elements 920 and a second power terminal 950 electrically connected to the second magnetic elements 930. In this case, the first power terminal 940 may include a ground GND1 of the first magnetic elements 920, and the second power terminal 950 may include a ground GND2 of the second magnetic elements 930. In this case, the grounds GND1 and GND2 of the first magnetic elements 920 and the second magnetic elements 930 may be formed separately from a power terminal Vcc.

The board 910 may include a first region 911, a second region 912, and a third region 913.

The first region 911 may be formed in an outer edge of the board 910. The first region 911 may be disposed adjacent to the ground GND1 of the first magnetic elements 920. In this case, the first region 911 may extend to an outer border of the board 910. Meanwhile, the first region 911 may also be spaced apart from the outer border of the board 910. A first ground pattern GP1 may be formed in the first region 911. In this case, the first region 911 may be electrically connected to the ground GND1 of the first magnetic element 920.

A first hole 911h may be formed in the first region 911. In this case, the ground pattern GP1 may be formed around the first hole 911h in the first region 911. In addition, a first screw 810 coupled to a bracket 520 may pass through the first hole 911h. The first screw 810 passing through the first hole 911h is in contact with the first ground pattern GP1 of the first region 911.

The second region 912 may be formed in the outer edge of the board 910. In this case, the second region 912 may be spaced apart from the first region 911. The second region 912 may be disposed adjacent to the ground GND2 of the second magnetic elements 930. In this case, the second region 912 may extend to the outer border of the board 910. Meanwhile, the second region 912 may also be spaced apart from the outer border of the board 910. A second ground pattern GP2 may be formed in the second region 912. In this case, the second region 912 may be electrically connected to the ground GND2 of the second magnetic elements 930.

A second hole 912h may be formed in the second region 912. In this case, the ground pattern GP2 may be formed around the second hole 912h in the second region 912. In addition, the first screw 810 coupled to the bracket 520 may pass through the second hole 912h. The first screw 810 passing through the second hole 912h is in contact with the second ground pattern GP2 of the second region 912. In this case, the first screw 810 may be provided as a plurality of first screws 810, pass through each of the first hole 911h and the second hole 912h, and be coupled to the bracket 520. The first screws 810 couple the circuit board 900 and the bracket 520 to be grounded. However, the first screw 810 may also not pass through either of the first hole 911h and the second hole 912h.

A shape of the first region 911 may be the same as a shape of the second region 912. In this case, the first region 911 may have a circular or partially circular shape. In addition, a radius of the first region 911 may be greater than a radius of the first hole 911h. In addition, a shortest distance W3 from the first hole 911h to a border of the first region 911 may be greater than a radius of an end portion of the first screw 810. Meanwhile, a longest distance W4 from the first hole 911h to the border of the first region 911 may be smaller than a distance D4 between the first hole 911h and the third hole 913h formed in the third region 913.

The third region 913 is a region on the board 910 excluding the first region 911 and the second region 912. Here, a ground pattern is not formed on the third region 913. At least one third hole 913h may be formed in the third region 913. The third hole 913h may be provided as a plurality of third holes 913h. The plurality of third holes 913h may overlap in a radial direction. However, the plurality of third holes 913h may also be disposed to be misaligned with each other in the radial direction. Referring to FIG. 7, the distance D4 between the first hole 911h and the third hole 913h may be smaller than a distance D3 between the first hole 911h and the second hole 912h. In addition, a distance D5 between the second hole 912h and the third hole 913h may be smaller than the distance D3 between the first hole 911h and the second hole 912h. In addition, the distance D4 between the first hole 911h and the third hole 913h may be the same as the distance D5 between the second hole 912h and the third hole 913h.

More specifically, when a virtual line L1 connecting a shaft center C and the third hole 913h is drawn, the first region 911 may be disposed at one side with respect to the virtual line L1, and the second region 912 may be disposed at the other side with respect thereto. In addition, with respect to the virtual line L1, the first magnetic element 920 may be disposed at the same side as the first region 911, and the second magnetic element 930 may be disposed at the same side as the second region 912. In this case, with respect to the virtual line L1, the first region 911 and the second region 912 may be symmetrical, and the first magnetic element 920 and the second magnetic element 930 may be symmetrical.

The first screw 810 or a second screw 820 may pass through the third hole 913h. In this case, when the first screw 810 does not pass through either of the first hole 911h and the second hole 912h, the first screw 810 may pass through at least two of the third holes 913h and be coupled to the bracket 520. In addition, a guide member (not shown) may be disposed in each of the first hole 911h and the second hole 912h. In this case, the circuit board 900A and the bracket 520 are coupled in an ungrounded state. Meanwhile, when the first screw 810 passes through the first hole 911h and the second hole 912h and is coupled to the bracket 520, the second screw 820 may pass through the third hole 913h and be coupled to the bracket 520. In this case, a coupling block (not shown) having a "T" shape may be formed on a lower surface of the bracket 520. In addition, a plurality of coupling holes (not shown) to be coupled to the first screw 810 or the second screws 820 may be formed in the coupling block (not shown). In this case, the plurality of coupling holes (not shown) may be formed at positions corresponding to the first hole 911h, the second hole 912h, and the third holes 913h.

FIG. 10 is a plan view illustrating a third example of the circuit board. In this case, in the third example of the circuit board illustrated in FIG. 10 and the second example of the circuit board illustrated in FIGS. 7 to 9, there are differences in the positions and number of third holes therebetween, and except that, there are no differences. Accordingly, hereinafter, only features of the present embodiment will be described, and the same content as the second example of the circuit board described with reference to FIGS. 7 to 9 will be omitted.

Referring to FIG. 10, at least two third holes 913h disposed at an outer side of a third region 913 may be formed in a circuit board 900B. In this case, one of the third holes 913h may be adjacent to a first hole 911h, and the other may be adjacent to a second hole 912h. In this case, the first hole 911h, the second hole 912h, and the at least two third holes 913h may be disposed on the same circumferential line.

Although not illustrated in the drawing, two first screws for coupling the circuit board 900B to a bracket 520 may be provided. In this case, one of the first screws may pass through only one selected from the first hole 911h and the second hole 912h and be coupled to the bracket 520. In addition, the other first screw may pass through the third hole 913h adjacent to the other from the first hole 911h and the second hole 912h and be coupled to the bracket 520. For example, one first screw may pass through the first hole 911h, and the other first screw may pass through the third hole 913h adjacent to the second hole 911h and be coupled to the bracket 520. In this case, one first screw is grounded through a ground pattern GP1 of the first region 911, and the other is not grounded through a ground pattern GP2 of the second region 912. Conversely, one first screw may also pass through the second hole 912h, and the other first screw may also pass through the third hole 913h adjacent to the first hole 911h and be coupled to the bracket 520. In this case, one first screw is not grounded through the ground pattern GP1 of the first region 911, and the other first screw is grounded through the ground pattern GP2 of the second region 912.

In addition, a third hole 913h disposed on a circumferential line different from those of a circumference of the first hole 911h and the second hole 912h may also be additionally formed in the third region 913. The third hole 911h is to be coupled to a second screw to reinforce a fastening force between the board 910 and the bracket 520. In this case, the third hole 913h may be disposed on a circumferential line which is different from those of the first hole 911h and the second hole 912h. In this case, the third hole 913h may be disposed inward from the first hole 911h and the second hole 912h.

The above-described embodiment may be used in various devices for vehicles, home appliances, or the like.

[Reference Numerals]

| | |
|---|---|
| 100: SHAFT | 200: ROTOR |
| 300: STATOR | 400: BUSBAR |
| 500: HOUSING | 510: BODY |
| 520: BRACKET | 522: COUPLING BLOCK |
| 700, 900: CIRCUIT BOARD | 710, 910: BOARD |
| 711, 911: FIRST REGION | 712, 912: SECOND REGION |
| 913: THIRD REGION | 800: SCREW |
| 810: FIRST SCREW | 820: SECOND SCREW |

The invention claimed is:
1. A motor comprising:
   a shaft;
   a rotor coupled to the shaft;

a stator disposed outside the rotor;
a housing including a body disposed outside the stator and a bracket covering an opening of the body;
a sensing magnet coupled to an outer circumferential surface of the shaft to overlap with the rotor in an axial direction;
a circuit board disposed on the stator;
a coupling member which couples the circuit board to the bracket,
wherein the circuit board includes a board coupled to a lower portion of the bracket and a plurality of magnetic elements disposed on the board,
wherein the board includes a first region in which a ground pattern is formed and a second region excluding the first region,
wherein a first hole is formed in the first region,
wherein one or more second holes are formed in the second region,
wherein the coupling member includes a first screw which passes through one hole selected from the first hole and the second holes and is coupled to the bracket, and
wherein the magnetic elements are disposed on the board to face the sensing magnet.

2. The motor of claim 1, wherein the ground pattern is formed around the first hole in the first region.

3. The motor of claim 1, wherein the coupling member includes one or more second screws which pass through one or more of the remaining second holes and are coupled to the bracket.

4. The motor of claim 3, wherein the second holes include a 2a hole disposed closest to the first hole and one or more 2b holes spaced apart from the 2a hole,
wherein the first screw is disposed in one hole selected from the first hole or the 2a hole, and
wherein the second screw is disposed in the 2b hole.

5. The motor of claim 4, wherein a longest distance from the first hole to a border of the first region is smaller than a distance between the first hole and the 2a hole.

6. A motor comprising:
a shaft;
a rotor coupled to the shaft;
a stator disposed outside the rotor;
a housing including a body disposed outside the stator and a bracket covering an opening of the body;
a sensing magnet coupled to an outer circumferential surface of the shaft to overlap with the rotor in an axial direction;
a circuit board disposed on the stator and including a board coupled to a lower portion of the bracket and a plurality of magnetic elements mounted on the board; and
a coupling member which couples the circuit board to the bracket,
wherein the board includes a first region in which a first ground pattern is formed, a second region which is spaced apart from the first region and in which a second ground pattern is formed, and a third region excluding the first region,
wherein a first hole is formed in the first region,
wherein a second hole is formed in the second region,
wherein one or more third holes are formed in the third region,
wherein the coupling member includes one or more first screws which pass through each of the first hole and the second hole or the third holes and are coupled to the bracket, and
wherein the magnetic elements are disposed on the board to face the sensing magnet.

7. The motor of claim 6, wherein the first ground pattern is formed around the first hole in the first region.

8. The motor of claim 6, wherein the coupling member includes one or more second screws passing through one or more of the third holes and coupled to the bracket.

9. The motor of claim 6, wherein, when a virtual line connecting a center of the shaft and the third hole is formed, with respect to the virtual line:
the first region is disposed at one side; and
the second region is disposed at an other side.

10. A motor comprising:
a shaft;
a rotor coupled to the shaft;
a stator disposed outside the rotor;
a housing including a body disposed outside the stator and a bracket covering an opening of the body;
a sensing magnet coupled to an outer circumferential surface of the shaft to overlap with the rotor in an axial direction;
a circuit board disposed on the stator; and
a coupling member which couples the circuit board to the bracket,
wherein the circuit board includes a board coupled to a lower portion of the bracket, a first magnetic element and a second magnetic element which are disposed apart from each other on the board, a first power terminal electrically connected to the first magnetic element, a second power terminal electrically connected to the second magnetic element, a first ground electrically connected to the first magnetic element, and a second ground electrically connected to the second magnetic element,
wherein the board includes a first region in which a first ground pattern is formed, a second region in which a second ground pattern is formed, and a third region excluding the first region and the second region,
wherein the first ground pattern and the second ground pattern are disposed apart from each other,
wherein a first hole is formed in the first region,
wherein a second hole is formed in the second region,
wherein one or more third holes are formed in the third region, and
wherein the first and second magnetic elements are disposed on the board to face the sensing magnet.

11. The motor of claim 10, wherein the first power terminal and the second power terminal are disposed apart from each other, and
wherein the first ground and the second ground are disposed apart from each other.

12. The motor of claim 11, wherein the first ground pattern is disposed adjacent to the first power terminal, and
wherein the second ground pattern is disposed adjacent to the second power terminal.

13. The motor of claim 10, wherein the coupling member passes through at least any one of the first hole and the second hole and is coupled to the bracket.

14. The motor of claim 10, wherein the coupling member passes through the third hole and is coupled to the bracket.

15. The motor of claim 14, wherein one of the third holes is disposed on a same circumferential line as the first hole and the second hole, and
wherein another one of the third holes is disposed on a circumferential line different from those of the first hole and the second hole.

16. The motor of claim 10, wherein the first region and the second region are symmetrical with reference to a virtual line connecting a center of the shaft and the third hole.

17. The motor of claim 16, wherein the first magnetic element and the second magnetic element are symmetrical with reference to the virtual line.

* * * * *